Sept. 1, 1936. L. A. LAURSEN 2,052,930
VEHICLE SPRING UNIT
Filed Oct. 5, 1933
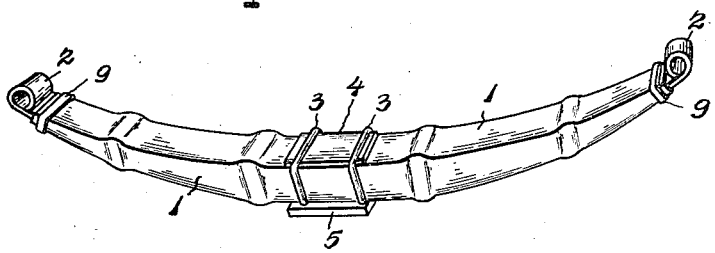
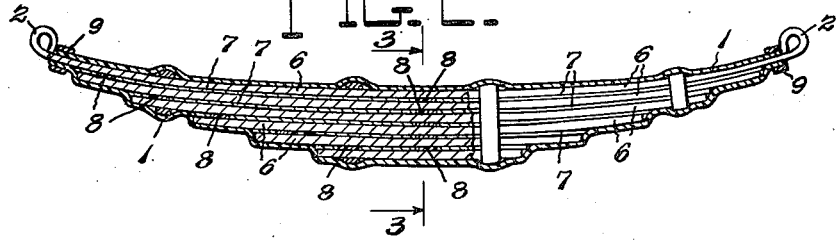
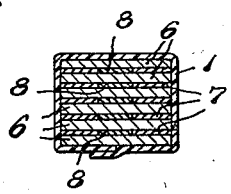
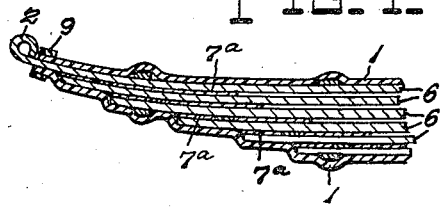
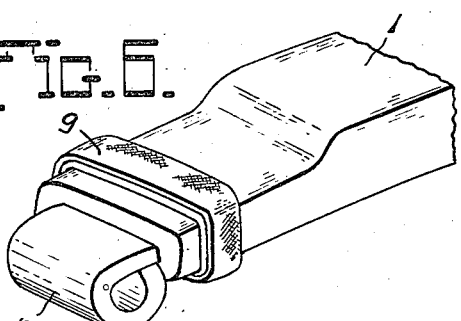
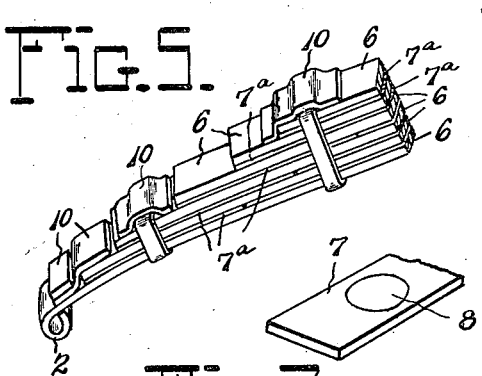
Inventor
LAURITS A. LAURSEN.
By Robb & Robb
Attorneys Patented Sept. 1, 1936

2,052,930

UNITED STATES PATENT OFFICE 2,052,930

VEHICLE SPRING UNIT

Laurits A. Laursen, Copley, Ohio

Application October 5, 1933, Serial No. 692,330

2 Claims. (Cl. 267—47)

The present invention involves an improved type of vehicle spring unit of the multiple leaf class wherein the leaves of the spring are assembled so as to permit slight relative movement or play to promote the necessary desired resilience of the structure.

This invention actually comprises a hermetically sealed multiple leaf spring unit, the sealing of which is obtained by the employment of a cover or jacket substantially entirely enclosing the multiple leaf structure of the unit. Between the leaves of the spring are mounted shock absorbing friction filler members composed of a substance rendered operative by the action of vulcanization or curing at a proper temperature. The enclosing jacket or covering for the spring unit is likewise made of a substance preferably rubber, subject to curing or vulcanization in the process of causing the same to hermetically seal and enclose the spring unit structure.

An important object, therefore, accomplished in the practical carrying out of the process of the invention and the article of manufacture created thereby, lies in the adaptability of the process to simultaneous curing of the shock absorbing friction filler elements between the leaves of the spring and the rubber covering enclosing the multiple leaf structure as a whole, all as will appear more fully hereinafter.

The present invention, in reference to its various features, may be explained as predicated upon a novel theory of the desired operation of multiple leaf vehicular springs. Springs as heretofore proposed, have generally been believed to most advantageously operate when the leaf structure of the springs is subjected to the action of a lubricant between the leaves retained in place by a covering or casing adapted to actually contain said lubricant. The idea of this spring structure is that the lubricant enables the leaves easily to move relatively to one another, and this objective obtained, the further provision is usually made by applying shock absorbers to the multiple leaf spring unit for retarding or braking the easy action of the leaves obtained by the lubrication of the same.

Now in the carrying out of my invention, my objective may be materially distinguished from that incident to the present types of springs most universally used, because, in these springs, it is almost impossible to keep dirt and other foreign matter from entering the covering in which the lubricant is contained.

In my covered spring unit structure, the hermetic sealing of the multiple leaf structure within the jacket or covering is such as to enable total exclusion of all dirt or foreign matter. Additionally, I insert between the leaves of the multiple leaf spring unit so hermetically sealed in its covering, shock absorbing friction filler members, the proper action of which may be ensured owing to the fact that oil, grease or foreign matter is precluded from interfering with such action owing to the sealed structure of the spring unit by the covering directly cured or vulcanized thereover.

Since the shock absorbing filler members are made of a composition including rubber, asbestos and/or other elements affording frictional resistance or braking, which composition is subject to curing, it is apparent that the capability of vulcanizing or curing the filler members simultaneously with the covering will dispense with the necessity of separate curing operations for these parts with resultant advantages from a commercial viewpoint in reducing the cost of production of my complete type of unit.

In obtaining the hermetic sealing of my cured covering for the spring unit, I utilize a novel combination of the raw material of the covering with constrictive means applied around the covering, at the ends of the springs, such as will cause a constant constricting pressure on the parts at the terminal points of the covering that must be absolutely sealed in order to permit of the proper curing or vulcanizing action to establish the hermetic connection between the covering and the metal portions of the spring structure itself.

Further objects and accomplishments of the invention will become apparent upon reference to the following detailed description in conjunction with the accompanying drawing, in which:—

Figure 1 is a perspective view of a multiple leaf spring unit with the hermetically sealed covering of my invention applied thereto.

Figure 2 is a longitudinal sectional view of the unit with the covering entirely in section and portions of the spring leaves and friction shock absorbing members illustrated in section and side elevation.

Figure 3 is a cross sectional view on the line 3—3 of Figure 2.

Figure 4 is a fragmentary sectional view of an end portion of the spring unit illustrating a slightly modified construction thereof.

Figure 5 is a broken perspective view of an end of the metal structure of the spring unit showing some of the preliminary steps incident to preparing the unit to be covered by the raw rubber stock preliminary to vulcanizing of the whole covered unit, certain portions of the multiple leaf structure and shackles connecting the leaves forming more or less sharp corners being indicated as having short pieces of raw rubber stock applied thereto to prevent the contacting portions of the main covering or rubber casing from being unduly thin at such more or less sharp corner portions.

Figure 6 is a fragmentary perspective view of an end portion of the spring as it is covered by the rubber stock and sealed at the end of the spring by the constricting sealing members such as cured rubber bands or tape, all preliminary to placing the metal spring unit structure and its covering in a vulcanizer for the curing operation.

Figure 7 is a perspective view of a portion of the friction shock absorbing or filler member provided with metal discs or abutment members.

In Figure 1 the parts of my hermetically sealed and covered spring unit illustrated may be designated as including the cured covering or jacket, of rubber or equivalent substance, the end loops 2 of the main or longest metal leaf of the multiple leaf spring structure, which loops are attachable to the usual shackles of an automotive vehicle, and the central clamping means including U bolts 3 and plates 4 and 5 customarily employed for facilitating the application of the spring to an axle structure or other equivalent supporting parts.

Referring to Figure 2, the parts in Figure 1 are quite well shown, but in addition, this figure reveals that between the metal leaves 6 of the spring unit, there are interposed the friction shock absorbing members 7. These members 7, as previously indicated, may be made of different substances or compositions, but a composition similar to that used for brake linings commonly employed today may be excellently utilized for the purposes of this invention. Such a composition may include a relatively small proportion of artificial rubber, asbestos, clay, and/or other mineral substances, and is susceptible of being cured to render it hard and effective as a friction material, affording a braking function, by the employment of heat at a proper temperature range, together with pressure, if desired.

Now it is apparent that the shock absorbing members 7 in Figure 2 extend along the spring leaves for the entire length of the space between the leaves in which said members are disposed. They may be said to be filler members, as well as shock absorbing members, therefore, and their purpose of use is to resist or brake the resilient action of the metal spring elements. It is essential that the friction shock absorbing or filler members 7 shall be made of a substance which is not stretchable and becomes hard when vulcanized. Since the metal spring leaves 6 and the filler members 7 are assembled before the latter parts are cured, and the leaves are clamped together under considerable pressure to determine the size of the spaces therebetween, I employ small metal discs or abutments 8, located at intervals in the lengths of the spaces between the metal spring leaves for ensuring the maintenance of a definite spaced relation of the leaves and a definite thickness of the friction filler members 7 when the latter are cured and thus hardened in the vulcanizing operation. The elements 8 will, of course, be vulcanized in place along with the parts 7 and the final covering or jacket 1 so there is no likelihood of their being displaced in the actual use of the spring unit. Owing to the relatively small superficial area of the parts 8, they will not interfere with the action of the parts 7 in affording the friction shock absorbing function of the last mentioned parts brought about incident to the relative longitudinal play or movement of the spring metal leaves relatively to one another.

In Figure 2, as well as Figure 1, the constricting bands or tape members 9 at the ends of the covering 1 are clearly shown, as well as in Figure 6, and for the purpose of these bands or constricting members, I may avail of stout cured rubber bands tightly embracing the raw rubber stock of the covering, after the latter has been wrapped about the metal spring structure in the manner well depicted in the drawing. Or, under some conditions, the constricting pressure may be obtained by a wrapping tape used either in conjunction with such cured rubber bands, or not.

In Figure 4 there is illustrated a slightly different form of spring leaf assembly, wherein the friction shock absorbing members 7a are only coextensive with a certain portion of the area of the spring leaves 6, near the ends of the latter. Under some conditions, especially in lighter spring structures, these fore-shortened shock absorbing members may be availed of, and they will be supplied, of course, with the embedded spacing discs 8, such as previously described.

In the process of making a spring unit such as I have generally set forth above, the friction filler members 7 are assembled between the leaves 6 of the spring in the manner shown in Figure 2. Then the raw rubber stock for the covering or jacket is applied about the entire spring unit in the manner similarly indicated in said figure, and in Figures 3 and 6, great care being exercised to apply this stock as tightly as possible so as to void as much air as can be eliminated from within the covering or jacket 1 when the covering is completed. The extremities of the covering are then sealed by means of the constricting members 9 designed to maintain their constricting pressure both before and during the vulcanizing or curing operation.

The parts of the spring unit as prepared in the above manner, are then placed in the vulcanizer and for this purpose, I may avail of a water curing process such as set forth in my Letters Patent No. 1,665,308 and No. 1,665,310, both issued on April 10, 1928. Or again, steam curing may be availed of within the purview of my invention; or curing in molds may be used.

An important phase of my invention resides in the curing of my prepared spring unit comprising the metal and uncured stock parts above set forth in naked condition, by which I mean that the rubber stock of the covering 1 is entirely exposed to the curing heat when placed in the vulcanizer.

In the carrying out of my process by curing with steam, it is desirable also that the curing pressure and temperature in the vulcanizer be applied as quickly as possible. Obviously, it takes a little longer for the inside structure of the unit, especially the metal parts, and the filler members 7 to become heated, than the outside or covering structure 1. So, therefore, in my curing process, the covering is momentarily heated more quickly and to a higher degree externally thereof, than internally, and this is equally applicable to the internally enclosed parts. Thus, in the initial curing, there is greater pressure outside of the casing or covering 1, which preliminarily partially cures and sets the same previous to the similar action upon the inner surface, and I find this operation desirable to ensure against the blowing out of the casing or sagging of the same, owing to the pocketing of any amounts of air that may remain intermediate the casing 1 and the metal spring and other enclosed structure of the unit. I may use a pressure of approximately one hundred pounds at the curing temperature, and when the curing is finished, I prefer to supply air to the vulcanizer or heater, at about a few pounds pressure. Thereafter, I prefer to spray the now vulcanized covered spring units with cold water in completing the operation.

The foregoing operations having been performed, there will be applied to the covering or casing 1, a coating of oil resisting substance. For this purpose, I may use a flexible shellac or an oil resisting flexible lacquer. This coating is for the purpose of preventing injury and deterioration of the cured rubber by contact with oil or other foreign matter incident to its use after my hermetically sealed or covered spring unit has been applied to a vehicle such as an automobile, or elsewhere.

When my spring unit is made in the above manner, it is evident that the parts enclosed in the casing or covering 1 are maintained absolutely clean so that the spring function of the metal elements will not be interfered with in any way by foreign matter, and so that the friction shock absorbing function of the filler members 7 will similarly never be interfered with as to efficient braking function.

Obviously, one curing operation will cause the curing of the substance from which the members 7 are made, as well as the vulcanizing of the outer enclosing casing 1. This affords a saving incident to the performing of separate curing operations for these parts, and a perfect fit between the parts 7 and spring leaves.

As shown in Figure 5, where the metal structure of the spring forms rather sharply projecting corner parts, I prefer to apply small pieces of rubber stock 10 so that the angles thus established, may be smoothed over so to speak, beneath the covering 1, and in this way when the covering becomes finally cured, these angular portions of the metal structure, do not create thin sections that would have a tendency to weaken the covering and possibly cause it to wear through at these particular places. In so far as the shock absorbing filler members 7 may be composed of a material susceptible of uniting with the substance from which the covering 1 is made, it is clear that in the curing operation, the parts 7 and 1 may become united at the contacting portions establishing a definite connection therebetween that subserves the object of properly sealing the covering about the leaves of the metal spring structure.

A unit comprising the parts, and made according to the process previously set forth, affords the advantages hereinbefore mentioned, in reference to ensuring the formation of a truly shock absorbing spring structure, one in which the multiple metal leaves of the spring are so enclosed with hermetic sealing of the covering thereover, that liability of entrance of any oil, or foreign matter, into the covering is totally avoided. In this way, the spring functioning of the unit may be predetermined with exactitude because of the fact that no interference with the action of the component parts will be permitted under the conditions of service to which the device is subjected when in use.

The advantages of an efficient spring unit such as I describe above, enabling the doing away with the use of a lubricant between the spring leaves, and also obviating the necessity of employing mechanical or hydraulic or other shock absorbing devices, are believed self evident.

Having thus described my invention, what I claim as new and desire to secure by Letters Patent of the United States, is:—

1. As a new article of manufacture, a covered spring unit for vehicles, comprising a series of relatively movable metal spring leaves, friction shock absorbing members between said leaves made of a cured substance, whereby it is rendered hard to obtain its friction action, and a covering for said relatively movable portions of the metal leaves and the shock absorbing members intermediate same, comprising cured rubber stock hermetically sealing said parts to enclose them, and spacing elements between the metal leaves of the springs for maintaining said leaves in a predetermined spaced relation when the substance from which the shock absorbing members are made, is being cured.

2. In a spring unit of the class described, the combination of relatively movable metal spring leaves, a covering of raw rubber stock cured about said leaves so as to enclose the movable portions thereof and prevent entrance of foreign matter, and yieldably contractible constricting members at the ends of the covering adapted to maintain the constricting pressure on the raw rubber stock during curing of the latter as well as initially, whereby to hermetically seal the covering to the adjacent portions of the metal spring leaf structure.

LAURITS A. LAURSEN.